United States Patent [19]

Yamada et al.

[11] 4,391,851

[45] Jul. 5, 1983

[54] PROCESS FOR PRODUCING A MAGNETIC RECORDING MEDIUM

[75] Inventors: Yasuyuki Yamada; Goro Akashi; Nobuo Tsuji; Yoshito Mukaida; Masaaki Fujiyama, all of Odawara, Japan

[73] Assignee: Fuji Photo Film Co., Ltd., Kanagawa, Japan

[21] Appl. No.: 353,791

[22] Filed: Mar. 2, 1982

[30] Foreign Application Priority Data

Mar. 2, 1981 [JP] Japan .................................. 56-29741

[51] Int. Cl.$^3$ ............................................. H01F 10/02
[52] U.S. Cl. .................................... 427/130; 427/127
[58] Field of Search ................................ 427/127–132, 427/48

[56] References Cited

U.S. PATENT DOCUMENTS 4,361,627 11/1982 Ohata .................................. 427/128

Primary Examiner—Bernard D. Pianalto
Attorney, Agent, or Firm—Sughrue, Mion, Zinn, Macpeak and Seas

[57] ABSTRACT

A process for producing a magnetic recording medium is disclosed. The process involves coating a non-magnetic base with magnetic coating solution containing fine ferromagnetic particles and a binder comprising nitrocellulose, polyol and an isocyanate having at least two isocyanato groups. In the process, the web having 0.3 to 3 wt % of the residual solvent in the magnetic layer is calendered, and the calendered web is then dried thoroughly.

21 Claims, No Drawings

PROCESS FOR PRODUCING A MAGNETIC RECORDING MEDIUM

FIELD OF THE INVENTION

The present invention relates to a process for producing a magnetic recording medium having good surface quality.

BACKGROUND OF THE INVENTION

A method is known for producing a magnetic recording medium comprising spreading a magnetic coating solution on a non-magnetic support base, drying the coating adequately and passing the base between calender rolls. The magnetic coating solution contains a binder, such as a cellulose derivative, vinyl chloride/vinyl acetate copolymer, polyurethane resin, acrylic resin, copolymer of acrylic acid or methacrylic acid and its ester, vinylidene chloride copolymer, synthetic rubber or polyester, and these binders are used alone or in combination. A technique is known for hardening the coating film by using both nitrocellulose and polyol or polyisocyanate as a binder. The coating solution containing these two compounds as a binder is spread onto a non-magnetic support base, dried and a roll of the resulting film is left before it is calendered to provide a smooth surface. This conventional method uses reaction resins (resins that harden by reacting with each other) as a binder to form a magnetic layer having increased mechanical strength. However, if the support base coated with magnetic coating solution containing such binder is left for a while, the curing reaction goes on to make the subsequent smoothing treatment by calendering difficult or inadequate. To solve this problem, the pressure or temperature of the calender rolls must be increased, but then, the life of the roll is reduced significantly by the increased roll pressure or temperature.

Nitrocellulose has high glass transition point and softening point and has long been used as a binder for magnetic tape. Magnetic particles are easily dispersed in nitrocellulose and hence, the coating solution containing nitrocellulose provides a smooth coating. But one of the recent requirements with magnetic tape is higher density of magnetic particles. To meet this requirement, a magnetic layer that has an even smoother surface and which is less susceptible to temperature and moisture must be developed. One candidate is a magnetic recording medium of the type wherein a binder resin such as the nitrocellulose in the magnetic layer is hardened. However, to produce such medium, the temperature and pressure of the calender rolls must be very high. As mentioned above this reduces the life or durability of the rolls. In the conventional method of producing magnetic tape, a web of the non-magnetic support base coated with magnetic coating solution is dried thoroughly, wound into a roll, and left for a while before it is passed between calender rolls. If the magnetic coating solution contains nitrocellulose, polyol and polyisocyanate as a binder, the resulting magnetic coating solution hardens so quickly that the web must be calendered at a very high temperature and pressure.

These conventional methods for producing magnetic recording media and tapes, the binder used therefor and the hardening techniques as discussed above are described in U.S. Pat. Nos. 4,172,176, 3,597,273, 3,216,846, 3,150,995, 4,049,871, 4,152,484, 4,115,290, 3,149,995, 3,926,826, 4,020,227, etc.

SUMMARY OF THE INVENTION

Therefore, one object of the present invention is to provide a process for producing a magnetic recording medium having high S/N ratio that uses the above-described curable binders (capable of being hardened) while producing a web that can be effectively calendered to provide a smooth surface.

This object can be achieved by a process for producing a magnetic recording medium by coating a non-magnetic support base with magnetic coating solution containing fine ferromagnetic particles and a binder comprising nitrocellulose, polyol and an isocyanate having at least two isocyanato groups, wherein the web having 0.3 to 3 wt% of the residual solvent in the magnetic layer is calendered, the calendered web then being dried thoroughly.

DETAILED DESCRIPTION OF THE INVENTION

According to the process of the present invention, the web of a non-magnetic support base having a magnetic layer coated thereon before calendering is soft since the coating solution contains a larger amount of solvent as compared with that in the conventionally prepared web. In the conventional process, the web to which magnetic coating solution has been applied is dried with heat until the residual solvent content becomes 0.01 to 0.03 wt%. After drying, it is wound into a roll which is left for a while before calendering. By this time the web about to be calendered has undergone a considerable amount of the curing reaction. However, according to the present invention, the time between the application of magnetic coating solution and the calendering is so short that the web can be calendered before a substantial degree of the curing reaction takes place. For these two reasons, the web can be calendered most effectively by the present invention.

The nitrocellulose used in the present invention preferably has an average degree of polymerization of from 50 to 300, more preferably from 80 to 200, and a degree of nitration of from 10.7 to 13.0, more preferably from 11.5 to 12.2. If the degree of polymerization is too low, the magnetic coating solution does not form a strong film. If the degree of polymerization is too high, much solvent is necessary for providing the magnetic coating solution with a predetermined viscosity and it is cumbersome to evaporate a large volume of solvent from the wet web. If the degree of nitration is too high, the magnetic particles are not easily dispersed and the resulting magnetic layer does not have great resistance to wear. If the degree of nitration is too low, the nitrocellulose becomes less miscible with other binder components and a magnetic layer having great wear resistance cannot be obtained.

The polyol may be either polyester type or polyether type. Whichever type is used, the polyol preferably has a molecular weight of from 300 to 5,000, more preferably from 600 to 4,000. If the molecular weight is less than 300, the polyol becomes highly reactive with polyisocyanate to form a magnetic layer which is too hard. If the molecular weight is more than 5,000, the reactivity of polyol is decreased so much that the resulting magnetic layer is too soft. The polyol may be linear or branched.

The polyester polyol is usually a hydroxy-terminated compound that is prepared by reacting a polybasic acid, preferably a dibasic acid, with a polyvalent hydroxy compound. Examples of the dibasic acid are organic acids such as adipic acid, phthalic acid, dimerized linoleic acid and maleic acid, preferably adipic acid and phthalic acid, most preferably adipic acid. Examples of the polyvalent hydroxy compound are glycols of ethylene, propylene, butylene, and diethylene, as well as 1,6-hexanediol, neopentyl glycol, trimethylolpropane, hexanetriol, glycerin, trimethylolethane and pentaerythritol, preferably butylene glycol, diethylene glycol, 1,6-hexanediol and neopentyl glycol, and most preferably butylene glycol and neopentyl glycol. Commercial polyols are available from Bayer A.G. under the trade name of Desmophen 800, 1100 and 1200 each consisting of adipic acid, phthalic acid and triol, Desmophen 2100 consisting of adipic acid and diol, and Alkidal RD-18.

The polyether polyol is also a hydroxy-terminated compound that is usually prepared by polymerizing alkylene oxides or copolymerizing them with diols or triols. Suitable alkylene oxides are ethylene oxide and propylene oxide. Suitable diols are poly(oxypropylene)glycol, poly(oxypropylene)poly(oxyethylene)glycol, poly(oxybutylene)glycol, and poly(oxytetramethylene)glycol, more preferably poly(oxybutylene)glycol, and suitable triols are poly(oxypropylene)triol, poly(oxypropylene)poly(oxyethylene)triol and poly(oxypropylene)poly(oxyethylene)poly(oxypropylene)triol.

The isocyanate used in the present invention is an aliphatic or alicyclic di-, tri- or tetraisocyanate, or an aromatic di-, tri- or tetraisocyanate wherein the aromatic is benzene, naphthalene, biphenyl, diphenylmethane or triphenylmethane, or adducts thereof. Specific examples include isocyanates such as ethane diisocyanate, butane-$\omega,\omega'$-diisocyanate, hexane-$\omega,\omega'$-diisocyanate, 2,2-dimethylpentane-$\omega,\omega'$-diisocyanate, 2,2,4-trimethylpentane-$\omega,\omega'$-diisocyanate, decane-$\omega,\omega'$-diisocyanate, $\omega,\omega'$-diisocyanato-1,3-dimethylbenzole, $\omega,\omega'$-diisocyanato-1,2-dimethylcyclohexane, $\omega,\omega'$-diisocyanato-1,4-diethylbenzole, $\omega,\omega'$-diisocyanato-1,5-dimethylnaphthalene, $\omega,\omega'$-diisocyanato-n-propylbiphenyl, 1,3-phenylene diisocyanate, 1-methylbenzole-2,4-diisocyanate, 1,3-dimethylbenzole-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4',4''-triisocyanate, tolylene diisocyanate, and 1,5-naphthylene diisocyanate; dimers or trimers of these isocyanates; and adducts of these isocyanates with diols or triols, such as the adduct of trimethylpropane and tolylene diisocyanate or hexamethylene diisocyanate, most preferably the adduct of trimethylpropane and tolylene diisocyanate or hexamethylene diisocyanate.

Conventional ferromagnetic particles, solvent, and additives such as dispersant, lubricant, abrasive and antistat as described in, for example, U.S. Pat. No. 4,135,016, are dispersed in the binder to make a magnetic coating solution which is applied to a conventional non-magnetic support base. The non-magnetic support base may be a plastic film made of polyesters such as polyethylene terephthalate, and polyethylene-2,6-naphthalate; polyolefins such as polyethylene and polypropylene; cellulose derivatives such as cellulose triacetate, cellulose diacetate, cellulose acetate butyrate, and cellulose acetate propionate; vinyl resins such as polyvinyl chloride and polyvinylidene chloride; and a plastic film such as polycarbonate, polyimide and polyamideimide.

Suitable ferromagnetic particles are fine grains of ferromagnetic iron oxide, ferromagnetic chromium dioxide and ferromagnetic alloys. The ferromagnetic iron oxide may contain a divalent metal such as Cr, Mn, Co, Ni, Cu or Zn which is usually present in an amount of from 0 to 10 atomic %. The suitable ferromagnetic chromium dioxide is $CrO_2$ which may optionally contain 0 to 20 wt% of a metal such as Na, K, Ti, V, Mn, Fe, Co, Ni, Tc, Ru, Sn, Ce or Pb, a semiconductor such as P, Sb or Te, or an oxide of these metals.

Suitable dispersants include aliphatic acids having 12 to 18 carbon atoms ($R_1COOH$ wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps made of alkali metal (e.g., Li, Na, or K) or alkaline earth metal (e.g., Mg, Ca or Ba) salts of these aliphatic acids; fluorine-containing compounds of these aliphatic acid esters; amides of these aliphatic acids; polyalkyleneoxidealkyl phosphate ester; lecithin; trialkylpolyolefinoxyquaternary ammonium salt (wherein the alkyl has 1 to 5 carbon atoms, and examples of the olefin are ethylene and propylene). Higher alcohols having 12 or more carbon atoms, and sulfate esters can also be used as the binder.

The dispersants mentioned above can also be used as a lubricant. Other suitable lubricants are silicone oils such as dialkylpolysiloxane (the alkyl having 1 to 5 carbon atoms), dialkoxypolysiloxane (the alkoxy having 1 to 4 carbon atoms), monoalkylmonoalkoxypolysiloxane (the alkyl having 1 to 5 carbon atoms, the alkoxy having 1 to 4 carbon atoms), phenylpolysiloxane, and fluoroalkylpolysiloxane (the alkyl having 1 to 5 carbon atoms); fine particles of an electrically conductive material such as graphite; fine particles of an inorganic material such as molybdenum disulfide and tungsten disulfide; fine particles of plastics such as polyethylene, polypropylene, polyethylene/vinyl chloride copolymer and polytetrafluoroethylene; $\alpha$-olefin polymers; unsaturated aliphatic hydrocarbons that are liquid at ordinary temperatures (n-olefin having a double bond attached to a terminal carbon atom; a carbon atom is 20); aliphatic acid esters of a monobasic aliphatic acid having 12 to 20 carbon atoms and a monovalent alcohol having 3 to 12 carbon atoms, and fluorocarbons.

Suitable abrasives are fused alumina, silicon carbide, chromium oxide ($Cr_2O_3$), corundum, artificial corundum, diamond, artificial diamond, garnet, and emery (main components: corundum and magnetite).

Suitable antistats are fine particles of an electrically conductive material such as carbon black, or carbon black graft polymer; a natural surfactant such as saponin; an alkylene oxide, glycerin or glycidol nonionic surfactant; a cationic surfactant such as higher alkylamines, quaternary ammonium salts, heterocyclic compounds (e.g., pyridine) and phosphonium or sulfoniums; an anionic surfactant containing an acidic group such as carboxylic acid group, sulfonic acid group, phosphoric acid group, sulfate ester group or phosphate ester group; and an amphoteric surfactant such as amino acids, aminosulfonic acids, and sulfate or phosphate esters of aminoalcohol.

Suitable organic solvents for the coating solution include ketones such as acetone, methyl ethyl ketone, methyl isobutyl ketone and cyclohexanone; esters such as methyl acetate, ethyl acetate, butyl acetate, ethyl lactate, and glycol acetate monoethyl ether; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene.

According to the present invention, it is essential that the binder contains nitrocellulose, polyol and isocyanate. Optional components are nitrile rubber, polyurethane resin and their prepolymers which are used to modify the hardness of the magnetic layer. The respective components of the magnetic layer are used in the following amounts. The weight ratio of the fine ferromagnetic particles to the binder is preferably 100:13–50, more preferably 100:17–30. The ratio of the number of OH groups of polyol to that of NCO groups of isocyanate (OH/NCO) is preferably 1/0.6–1.5, more preferably 1/0.8–1.2. The weight ratio of nitrocellulose to polyol is preferably 100:150–70, more preferably 100:120–80. The weight ratio of nitrocellulose to polyisocyanate is preferably 100:150–20. The solvent is used in an amount twice to three times that of the fine magnetic particles. The dispersant, lubricant and abrasive are used in amounts of from 0.5 to 20 parts by weight, from 0.2 to 20 parts by weight, and from 0.5 to 20 parts by weight, respectively, for 100 parts by weight of the binder. The fine particles of electrically conductive material are used in an amount of from 0.2 to 20 parts by weight if they are used as an antistat. The surfactant is used in an amount of from 0.1 to 10 parts by weight if it is used as an antistat. Nitrile rubber or polyurethane is used in an amount of 5 to 20 parts by weight for 100 parts by weight of the binder.

The magnetic particles, binder, dispersant, lubricant, abrasive, antistat and solvent are mixed into magnetic coating solution. The so prepared magnetic coating solution is applied onto a non-magnetic support base to form a magnetic layer. The thickness of the magnetic layer is usually from 1 to 18 μm on a dry basis, and the specific thickness varies with the use, shape (e.g., film, tape or sheet) and specifications of the magnetic recording medium.

The magnetic layer is optionally passed through a magnetic field to orient the magnetic particles. Thereafter, the web is dried until the residual solvent in the magnetic layer is from 0.3 to 3 wt%, preferably from 0.5 to 1.5 wt%, of the weight of the magnetic layer. If the amount of the solvent is less than 0.3 wt%, the magnetic layer becomes too hard and cannot be calendered effectively enough to provide a magnetic recording medium having good surface quality. If the amount of the solvent is more than 3 wt%, the magnetic layer may stick to the roll surface. The drying temperature and duration vary with the type of solvent, the initial amount of the solvent in the magnetic coating solution, and its residual amount. However, in general, the drying temperature is from 40° to 100° C. and is increased gradually as the drying proceeds, and the drying duration is from about 5 seconds to 3 minutes.

After the drying, the magnetic recording medium (web) may be wound into a roll, but usually, it is directly calendered without being wound into a roll. Any conventional calender rolls may be used to supercalender the magnetic recording medium (web). For example, the web may be passed between a metal roll and cotton roll or synthetic resin (e.g., nylon or polyurethane) roll, or between two metal rolls. The specific calendering conditions can vary with the use and specifications of the tape. Usually, the linear nip pressure is from 80 to 300 kg/cm, preferably from 100 to 240 kg/cm, the tape transport speed is from 30 to 200 m/min, preferably from 60 to 150 m/min, and the roll temperature is from 25° to 120° C., preferably from 30° to 50° C. If the nip pressure is less than 80 kg/cm, the surface of the magnetic layer cannot be smoothed adequately, and if the nip pressure is greater than 300 kg/cm, the life of the calender rolls is shortened, which is certainly a disadvantage as to economy. If the roll temperature is lower than 25° C., the surface of the magnetic layer is not smoothed adequately, and if the temperature is higher than 120° C., the life of the calender rolls is shortened. If the calendering speed is less than 30 m/min, the surface of the magnetic layer cannot be smoothed adequately, and if the speed is greater than 200 m/min, web handling is difficult.

The calendered web is subjected to another drying. The second drying is usually performed at a temperature between 50° and 150° C., preferably between 70° and 110° C., until the content of the residual solvent in the magnetic layer is less than 0.03 wt% of the magnetic layer.

In the conventional process for manufacturing magnetic recording media, the web is calendered at a temperature of at least 60° C. and a pressure of at least 200 kg/cm. However, according to the process of the present invention, the respective lower limits are 25° C. and 80 kg/cm. In spite of such low temperatures and pressures, the web can be effectively calendered to provide a magnetic recording medium having high surface quality or S/N ratio. As a further advantage, the use of a curable binder leads to the formation of a durable magnetic layer. A very good result is obtained by the process of the present invention wherein the interval between the coating step and the calendering step is very short. What is more, the life of the calender rolls is extended because the web can be calendered at low temperature and low pressure. Still another merit is that since a roll of the web need not be subjected to bulk thermo-treatment or other heat treatments after a take up of tape, the resulting magnetic recording medium is free from skew due to a heat-shrunk base.

The present invention is now described in greater detail by reference to the following examples and comparative examples which are given here for illustrative purposes only and are by no means intended to limit its scope. In the examples and comparative examples, all parts are by weight.

EXAMPLE 1

A magnetic coating solution having the composition indicated below was prepared with a ball mill and sand mill.

| | parts |
|---|---|
| Magnetic particles (Co-modified $\gamma$-Fe$_2$O$_3$, coercive force: 650 Oe, average grain size: 0.33μ) | 300 |
| Nitrocellulose (RS ½) | 30 |
| Polyol (Desmophen 800 of Bayer A.G.) | 15 |
| Polyol (Desmophen 1100 of Bayer A.G.) | 15 |
| Polyisocyanate (Demodur L of | 25 |

-continued

| | parts |
|---|---|
| Bayer A.G.) | |
| Carbon black | 15 |
| Abrasive (Cr$_2$O$_3$) | 3 |
| Myristic acid | 1.5 |
| Silicone oil | 1.0 |
| Methyl ethyl ketone/cyclohexanone (wt. ratio: 6/4) | 750 |

The magnetic coating solution was applied to a polyethylene terephthalate base 15μ thick to form a magnetic layer in a dry thickness of 5μ. The magnetic layer was heated at 60° C. for about 30 seconds, and the web having 0.8 wt% of the residual solvent in the magnetic layer was calendered (linear nip pressure: 180 kg/cm, temperature: 35° C., web transport speed: 80 m/min), and subsequently heated at 110° C. for about 80 seconds until the residual solvent content was 0.02 wt%. The dried web was slit into a magnetic tape ½ inch wide which was referred to as Sample No. 1.

COMPARATIVE EXAMPLE 1

Comparative Sample No. 1 was prepared as in Example 1 except that immediately after the application of the magnetic coating solution, the web was heated at 80° C. for 50 seconds to reduce the residual solvent content to 0.02 wt%, then wound into a roll, and 18 hours after the application of the magnetic coating solution, the web was calendered.

COMPARATIVE EXAMPLE 2

Comparative Sample No. 2 was prepared as in Example 1 except that the nitrocellulose was replaced by a vinyl chloride/vinyl acetate resin (VAGH of Union Carbide Corporation, vinyl chloride/vinyl acetate/vinyl alcohol (wt. ratio)=91:3:6, degree of polymerization: 420).

COMPARATIVE EXAMPLE 3

Comparative Sample No. 3 was prepared as in Example 1 except that the polyol was replaced by a thermoplastic polyurethane resin (Ester 5701 of The Goodrich, B. F. Company, m.w.=37,000).

The S/N ratio (signal to noise ratio) and durability of the four samples were as follows.

| | Factor | |
|---|---|---|
| Sample | Chroma S/N* | Durability (still life) |
| Sample No. 1 | 0 | 30 min or more |
| Comparative Sample No. 1 | −3.1 | 30 min or more |
| Comparative Sample No. 2 | −0.1 | 3 min or less |
| Comparative Sample No. 3 | −2.1 | 18 min |

*Values relative to the S/N of Sample No. 1.

The magnetic tape of Example 1 had high chroma S/N ratio and great durability. The tape of Comparative Example 1 that was prepared by calendering a web that had been dried to a very low residual solvent content, then wound into a roll and left for 18 hours had great durability but its chroma S/N ratio was very low. The tape of Comparative Example 2 that was prepared by replacing nitrocellulose with a vinyl chloride/vinyl acetate resin had very low durability. This is perhaps because the resin had a low softening point. The tape of Comparative Example 3 using a thermoplastic resin that was little effective in causing the curing reaction was not calendered effectively, perhaps due to the elasticity of the magnetic layer, and hence had low chroma S/N ratio. Its durability was also not great.

From the above-described results, it can be seen that when the coating layer containing a large amount of the residual solvent is coated as a magnetic layer in accordance with the present invention, the web can be effectively calendered without increasing the temperature and pressure of the calender rolls to provide a magnetic recording medium having high surface quality (e.g., a smooth surface) or S/N ratio.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium, comprising the steps of:
   providing a non-magnetic support base;
   coating a surface of said base with a magnetic coating solution comprising:
      fine ferromagnetic particles;
      a binder comprising nitrocellulose, polyol and an isocyanate having at least two isocyanato groups; and
      a solvent;
   evaporating said solvent until said magnetic layer coated on said base is comprised of 0.3 to 3 wt% of the residual solvent;
   calendering said base; and
   drying the calendered base.

2. A process for producing a magnetic recording medium as claimed in claim 1, wherein said nitrocellulose has an average degree of polymerization of from 50 to 300 and a degree of nitration of from 10.7 to 13.0.

3. A process for producing a magnetic recording medium as claimed in claim 2, wherein said degree of polymerization is from 80 to 200 and said degree of nitration is from 11.5 to 12.2.

4. A process for producing a magnetic recording medium as claimed in claim 1, wherein said polyol has a molecular weight of from 300 to 5,000.

5. A process for producing a magnetic recording medium as claimed in claim 4, wherein said polyol has a molecular weight of from 600 to 4,000.

6. A process for producing a magnetic recording medium as claimed in claim 1, wherein the weight ratio of the fine ferromagnetic particles to the binder is 100:13–50.

7. A process for producing a magnetic recording medium as claimed in claim 6, wherein said ratio of the fine ferromagnetic particles to the binder is 100:17–30.

8. A process for producing a magnetic recording medium as claimed in claim 1, wherein the ratio of the number of OH groups of said polyol to NCO groups of said isocyanate is 1/0.6–1.5.

9. A process for producing a magnetic recording medium as claimed in claim 8, wherein said ratio of OH groups to NCO groups is 1/0.8–1.2.

10. A process for producing a magnetic recording medium as claimed in claim 1, wherein said binder contains nitrocellulose and polyol in a weight ratio of nitrocellulose:polyol of 100:150–70.

11. A process for producing a magnetic recording medium as claimed in claim 10, wherein said ratio of nitrocellulose:polyol is 100:120–80.

12. A process for producing a magnetic recording medium as claimed in claim 1, wherein said binder contains nitrocellulose and polyisocyanate in a weight ratio of nitrocellulose:polyisocyanate of 100:150 to 20.

13. A process for producing a magnetic recording medium as claimed in claim 1, further comprising a dispersant in an amount of 0.5 to 20 parts by weight, a lubricant in an amount of 0.2 to 20 parts by weight, and an abrasive in an amount of 0.5 to 20 parts by weight per 100 parts by weight of said binder.

14. A process for producing a magnetic recording medium as claimed in claim 1, further comprising electrically conductive particles in an amount of 0.2 to 20 parts by weight per 100 parts by weight of said binder.

15. A process for producing a magnetic recording medium as claimed in claim 1, further comprising a surfactant in an amount of 0.1 to 10 parts by weight per 100 parts by weight of the binder.

16. A process for producing a magnetic recording medium as claimed in claim 1, further comprising a nitrile rubber in an amount of 5 to 20 parts by weight per 100 parts by weight of said binder.

17. A process for producing a magnetic recording medium as claimed in claim 1, wherein said evaporation is carried out until said layer coated on said base is comprised of 0.5 to 1.5 weight percent of the residual solvent.

18. A process for producing a magnetic recording medium as claimed in claim 1, wherein said evaporation is carried out at a drying temperature of 40° to 100° C. for a period of 5 seconds to 3 minutes.

19. A process for producing a magnetic recording medium as claimed in claim 1, wherein said calendering is carried out with a linear nip pressure of from 80 to 300 kg/cm at a transport speed of 30 to 200 meters per minute.

20. A process for producing a magnetic recording medium as claimed in claim 19, wherein said linear nip pressure is from 100 to 240 kg/cm and said transport speed is from 60 to 150 meters per minute.

21. A process for producing a magnetic recording medium as claimed in claim 20, wherein said calendering is carried out at a temperature of from 25° to 120° C.

* * * * *